Aug. 16, 1949.　　　　　L. H. LARSEN　　　　　2,479,243
AUTOMATIC GREENHOUSE VENTILATOR
Filed Feb. 16, 1945　　　　　　　　　　　　　　2 Sheets-Sheet 1
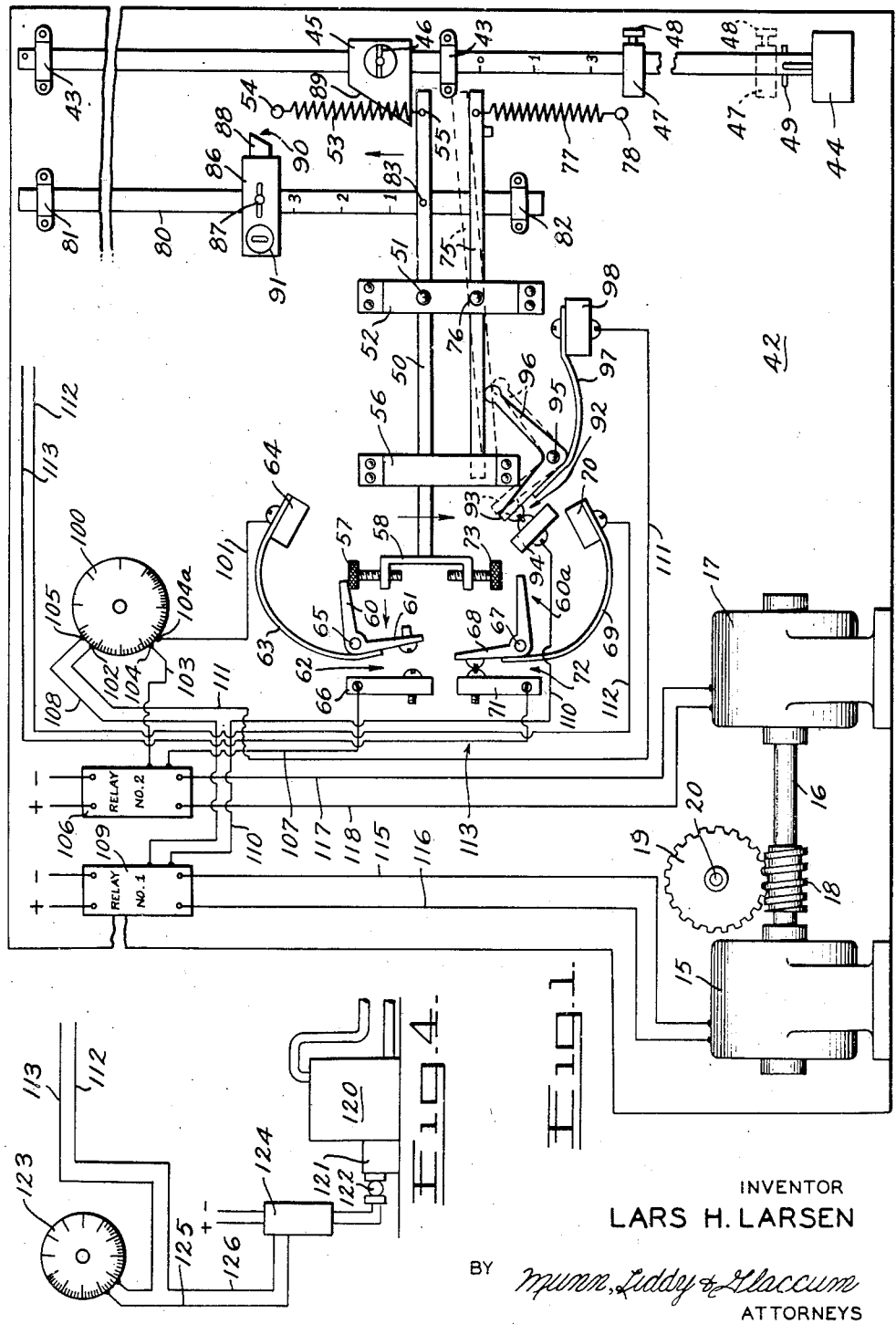
INVENTOR
LARS H. LARSEN
BY
ATTORNEYS Aug. 16, 1949.　　　　　L. H. LARSEN　　　　　2,479,243
AUTOMATIC GREENHOUSE VENTILATOR
Filed Feb. 16, 1945　　　　　　　　　　　　　2 Sheets-Sheet 2
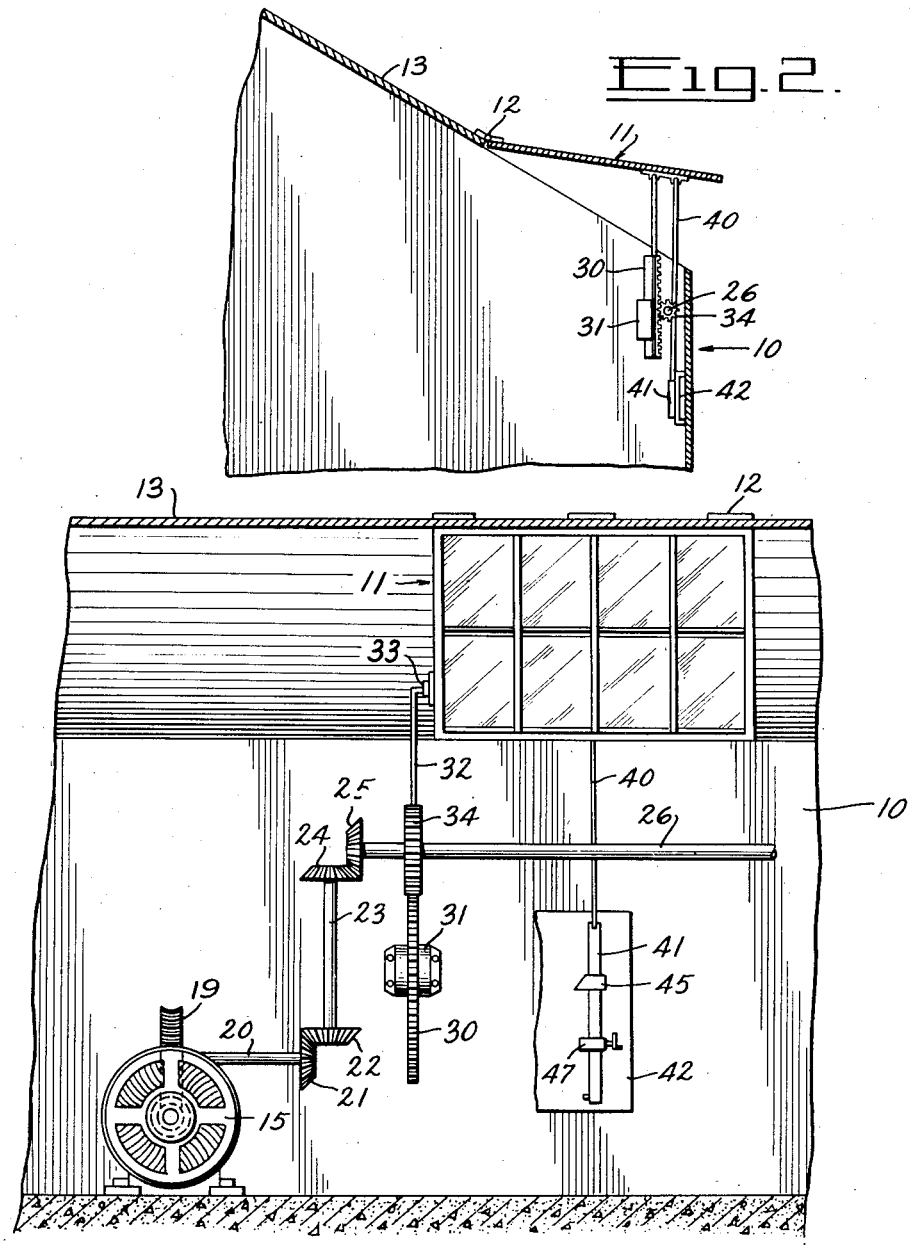
INVENTOR
LARS H. LARSEN
BY
ATTORNEYS Patented Aug. 16, 1949

2,479,243

UNITED STATES PATENT OFFICE 2,479,243

AUTOMATIC GREENHOUSE VENTILATOR

Lars Hongaard Larsen, Yakima, Wash.

Application February 16, 1945, Serial No. 578,316

4 Claims. (Cl. 236—49)

1

This invention relates to automatically controlled ventilators for buildings of various types.

An object of the invention is the provision of an apparatus for opening and closing ventilators, the degree of opening and closing depending upon the temperature of the interior of a building, with means for limiting the opening or closing as desired.

Another object of the invention is the provision of an apparatus for automatically opening or closing ventilators of a building by electric motors in which the motors are controlled thermostatically with a heating apparatus likewise controlled thermostatically, one motor being operated for causing opening of the ventilator, while the other motor is actuated to close the ventilator, both motors being connected together by a single shaft mechanism being manually set for limiting the opening or closing of the ventilators.

A further object of the invention is the provision of an apparatus for controlling the opening or closing of a ventilator or a plurality of ventilators of a building in accordance with the temperature desired within said building, the device including levers which are operated by a reciprocating bar connected with a hinged ventilator when said ventilator is lowered or raised by motors which in turn are set in operation by thermostatically controlled circuits, said levers operating switches for controlling the circuits to the motor and limiting the opening or closing of the ventilators.

Fig. 1 shows more or less diagrammatically an arrangement for automatically operating a ventilator.

Fig. 2 is a fragmentary vertical section of a building showing a ventilator in open position.

Fig. 3 is a longitudinal vertical section of a building showing a portion of the operating means for a ventilator.

Fig. 4 is a diagrammatic view of the thermostatically controlled heating apparatus associated with the ventilator control apparatus shown in Fig. 1.

Referring more particularly to the drawings 10 designates a building such as a greenhouse having ventilators 11 hinged at 12 to an edged portion of a roof 13. While a greenhouse is more particularly illustrated it will be appreciated that the ventilators may be applied to dwelling houses or office buildings.

A motor 15 is adapted to be rotated in one direction for revolving a shaft 16. A second motor 17 is adapted to be revolved in the opposite direction for rotating a shaft 16 in the opposite

2 direction. However, when one motor is supplied with current for driving the same, the other motor is idle so that the reverse rotation of the second motor will have no effect whatever since current is applied to one motor only at a time.

A worm 18 of the reversible type drives a worm gear 19 secured to a shaft 20. The shaft in turn drives a pinion 21 which meshes with a pinion 22 secured to a shaft 23. A pinion 24 is driven by the shaft 23 and meshes with a pinion 25 secured to a shaft 26. A clutch may be employed at each side of the reduction worm gear so that only one motor will be rotated at a time.

A rack 30 is slidably mounted in a bearing 31 secured to a fixed part of the building, and this rack is provided with an operating rod 32 at its upper end which has pivotal connections with a pin 33 secured to the ventilator 11. A gear 34 secured to the shaft 26 meshes with the rack 30 so that when the gear 34 is revolved by the shaft 26 the rack 30 will be raised or lowered as will be the free end of the ventilator 11.

Any number of ventilators 11 may be located in horizontal alinement, and each ventilator may be operated by a rack identical with that shown at 30 and a gear 34 with the gears located at spaced points along the shaft 26 and adjacent each ventilator.

A wire or cable 40 is connected with the ventilator 11 adjacent the lower edge and depends therefrom. The lower end of the wire is connected to a reciprocating rod 41 slidably mounted on a panel 42 which is secured to a fixed part of the building. The panel is adapted to support a plurality of instruments controlling the operation of the motors 15 and 17 for raising or lowering the ventilators as shown more particularly in Fig. 1.

The rod 41 is slidably mounted in bearings 43 secured to the panel 42. A weight 44 is secured to the lower end of the rod so that the rod will be automatically lowered after it has been raised. A stop 45 is mounted on the rod 41 and is adapted to be secured in place by a set screw 46. A second stop 47 is slidably mounted on the rod 41 and is held in place by a set screw 48. Stops 45 and 47 may be adjusted along the rod 41 for a purpose which will be presently explained.

A pin 49 carried by the lower end of the rod 41 below the stop 47 is adapted to be engaged by the stop in the event that the stop should accidentally slip downwardly to the bottom of the rod.

A lever 50 is pivotally mounted at 51 on a bracket 52 secured to the board 42. A coil spring 53 has one end secured at 54 to the panel 42 while the other end is secured to a lug 55 which projects downwardly from the outer end of the lever 50. The inner end of the lever is guided by a bracket 56 which is secured to the panel 42. This lever is adapted to be rocked so that its inner end may be oscillated for operating a switch moving member 57. The member 57 is in the form of a screw adjustably mounted in a threaded passage in the upper end of a U-shaped member 58 which is secured to the inner end of the lever 50.

As shown in Fig. 1 the member 57 is in engagement with an arm 60 to which is connected a contact 61 of a switch generally designated by the numeral 62. A spring 63 has one end secured to a block 64 attached to the panel 42. This spring tends to rock the contact 61 in the direction indicated by the arrow when the member 57 is moved away from the arm 60. The arm and contact have a common pivot 65 on the panel 42. A second element of the switch is indicated by the numeral 66 which has a fixed position on the panel.

A second arm 60a is pivoted at 67 on the panel and is adapted to rock a contact member 68 formed integrally with the arm 60a. A spring 69 has one end secured to a block 70 projecting from the panel 42 while the other end of the spring is connected to the contact 68 and tends at all times to move the contact in engagement with a second contact member 71 of a switch generally designated by the numeral 72.

An operating member 73 similar to the member 57 is adjustably supported by the lower end of the U-shaped member 58 and is adapted to rock the arm 60a and the contact 68 when the inner end of the lever 50 is moved downwardly into engagement with the arm 60a and when the rod 41 is moved upwardly carrying the stop 45 likewise upwardly away from the outer end of the lever 50 so that the spring 53 will pull the outer end of the lever upwardly and in the direction indicated by the arrow in Fig. 1.

A second lever 75 is pivotally mounted at 76 on the bracket 52 and has its inner end guided by the bracket 56. A coil spring 77 has one end connected at 78 to the panel while the other end is connected to the outer end of the lever 75. Said spring tends to maintain the outer end of the lever in retracted position sufficiently to disengage its opposite end from an arm 96 as will be presently explained.

A latch rod 80 is slidably mounted in bearings 81 and 82 secured to the panel 42. This latch rod at its lower end is pivotally connected at 85 with the lever 50 between its outer end and its pivot 51. A latch generally designated by the numeral 86 is adjustably held in place on the rod 80 by a set screw 87.

This latch includes a casing having a slidably mounted lock bolt 88 which is adapted to be moved inwardly of the casing when the cam surface 89 of the stop 45 engages the inclined face 90 of the projecting end of the bolt 88, said two surfaces being inclined so that if stop 88 is set in position on bar 80 to be tripped by stop 45 their inclined surfaces will push the latch 88 toward the left. This latch, as will be later explained, is employed when it is desired to effect a partial closure of the ventilator upon repeated opening and closing movements. A knob 91 extends from the casing of the latch 86 and is adapted to be rotated for drawing the bolt 88 into the casing when desired for releasing said bolt.

A switch 92 consists of the contacts or switch elements 93 and 94. It is in the circuit of motor 15 and is normally closed so that the motor is conditioned to open the ventilator whenever its circuit is energized. This circuit remains closed until the ventilator reaches the predetermined open position. The switch element 94 is fixed in place while the switch element 93 is pivotally mounted at 95 on the panel 42 and is adapted to be rocked when an integrally formed arm 96 is oscillated by the inner end of the lever 75. A spring 97 connected to the contact 93 and to a block 98 attached to the panel 42 tends to hold the contacts 93 and 94 normally closed. These contacts are eventually opened when arm 96 is depressed by movement of lever 75 as a result of the engagement therewith of stop 47 which occurs when the ventilator reaches its open position.

A thermostat 100 is mounted on the panel 42. A wire 101 connects the switch element 61 through the spring 63 with a contact 104a on the thermostat 100. A second wire 103 connects a second contact 104 on the thermostat 100 with one end of a secondary coil of a relay 106 while a wire 107 is connected between the other end of the secondary coil of the relay 106 and contact 66 so that when the switch 62 is closed current will flow to the motor 17. The primary coil of relay 106 is connected with the usual house current.

A wire 108 connects a contact 105 of the thermostat 100 with one end of a secondary coil in a relay 109. A wire 110 connects the other end of the secondary coil with the switch element 94 of the switch 92. The operating mechanism of the thermostat closes the pair of contacts 102 and 105 when temperature rises but opens said contacts when the temperature lowers. If the temperature falls sufficiently the contacts 104 and 104a will be closed. A wire 111 connects the contact 93 of switch 92 with a contact 102 on the thermostat 100. A wire 112 connects the switch element 68 with one side of the electric control and heating plant. A sceond wire 113 connects the switch element 71 of the switch 72 with the other side of the electrical equipment which controls the heating plant.

Wires 115 and 116 connect the relay 109 with the motor 15 while wires 117 and 118 connect the relay 106 with the motor 17.

The wiring diagram of Fig. 1 shows a motor means controlled by a primary circuit for opening the ventilator extending through a normally closed switch 92 and the maximum high contacts 102–105 on thermostat 100, together with a secondary circuit for closing the ventilator comprising the switch 62 operating in conjunction with the minimum low temperature contacts 104, 104a of the thermostat, said switches 92 and 62 being reversed by the lever arm mechanism actuated in unison with the movement of the ventilator. In order that the heating system or furnace may be also regulated automatically the control circuit thereof comprising the wires 112-113 extends through the pair of contacts 72. These are mounted on the panel 42 in juxtaposition to the aforementioned switches 92 and 62 in such a manner that they are opened when the secondary or ventilator closing circuit switch 62 is closed.

The operation of my device is as follows:

When it is quite cold but the sun is shining and the temperature inside the building is being maintained at approximately 56° F. the thermostat 100 is set so that it will close the circuit to open the ventilator at approximately 56°. It may be desired at this time to open the ventilator not more than 15 inches so that the member 47 is fixed on the bar 41 at the fifteen inch mark. When the sash is being opened and the rod 41 is being raised the member 47 will engage the outer end of the lever 75 against the tension of the spring 77 and raise the outer end while lowering the inner end of said lever thereby rocking the arm 96 and opening the switch 92 to the motor 15 through the relay 109.

When the rod 41 is raised the member 45 will likewise be raised so that the spring 53 will raise the outer end of the lever 50 while lowering the inner end so that switch 72 is opened and switch 62 is closed by the spring 63 to condition the circuit of motor 17 for subsequent operation when it is energized as a result of closing the contacts 104—104a at the thermostat.

When the temperature of the room drops to approximately 54° the thermostat 100 will close the contacts 104 and 104a so that the current will pass through relay 106 and since the switch 62 has been previously closed current will pass through relay #2 and cause operation of motor 17 so that the shafts 16 and 20 will be reversed.

When this happens the ventilator will be lowered and likewise rod 41 so that the member 45 will likewise be lowered until it strikes the outer end of the lever 50 and the outer end of said lever will be moved in the opposite direction to that indicated by the arrows in Fig. 1, so that switch 62 will be opened and motor 17 will stop. At this time the inner end of the lever 50 is depressed, thereby opening the switch 62 and cutting out motor 17 and the arm 60a is released through the action of the spring which closes the switch 72 to the electrical equipment of the heating plant so that the heating plant will be set in operation for increasing the temperature in the building.

The heating plant for the greenhouse, which may be conventional, is shown in Fig. 4 and comprises a boiler 120 having an oil burner 121 operated by a motor 122. This plant being controlled thermostatically, as previously mentioned, I have shown such a thermostat at 123 controlling motor 122 through relay 124 to which it is connected by wires 125, 126. Since thermostat 123 operates conjointly with thermostat 100 the wires 112, 113 leading from the latter are bridged across a gap in wire 126.

However, a passing cloud during the winter months or the early spring may affect the temperature in the building and it may be preferred to have the ventilator remain partly open for approximately five inches. In that event the latch member 86 is set upon the rod 80 at the point indicated at five inches and the latch bolt 88 will be released to the positon shown in Fig. 1. When the ventilator is being lowered the member 45 will engage the latch bolt 88 to prevent further downward movement of the rod 41, thereby forcing the latch rod 50 downwardly and thereby opening switch 62 so that the motor 17 is stopped and the ventilator will likewise be stopped in its downward movement. At the same time switch 72 is closed to the electrical equipment of the furnace. It will be seen by this construction that the ventilator may be entirely closed or it may be opened any degree desired within reasonable limits.

The control panel and thermostat will take care of any number of ventilators in any number of buildings where the same amount of ventilation is required.

A split phase type motor may be employed but, in that event, two relays will be required for each motor.

However, two small motors, one having a direct drive and the other a reverse rotation, are quite practical for the purposes described herein. Where two motors are employed one motor will revolve the other motor since the shafts are connected. However, since the current has energized only one motor the rotation of the second motor will have no effect on the operation of the device while the first motor is rotating. The gearing is such that the sash will be raised one inch per minute, and this speed is sufficient to take care of any quick changes in temperature.

It will be appreciated that while I have shown the thermostat 100 located on the board 42, it may be placed at some other point in a building where it will be more effective.

I claim:

1. A greenhouse temperature control system comprising a pivoted ventilator, a heating system having a control circuit provided with a normally closed switch and a greenhouse thermostat having sets of contacts which are closed at minimum low and maximum high temperatures, a motor for opening the ventilator having a control relay, a motor for closing the ventilator having a control relay, said relays being conditioned respectively by the thermostat contacts, a branch circuit for governing the relay of the ventilator opening motor having a pair of contacts which are normally closed when the ventilator is closed, a similar circuit for the relay of the ventilator closing motor which are normally open and adapted to be closed when the ventilator is opened, a pivoted arm serving to alternately close the last mentioned switch and open the switch of the heating system circuit, a second pivotal arm for opening the relay circuit of the ventilator opening motor, tension means for actuating each of said arms in one direction, and a rod movable with the ventilator having spaced stops thereon arranged to alternately engage said arms to move them respectively in opposite directions.

2. A greenhouse ventilator regulator comprising a pivoted ventilator, a vertically guided rod connected to the ventilator having an upper fixed stop and a lower adjustable stop, upper and lower pivoted arms, tension means for rocking the arms in opposite directions, one of which arms is moved against its tension when engaged by the upper stop when the ventilator is closed and the other arm being similarly operated upon engagement by the lower stop upon the ventilator reaching its maximum opening position, a pair of contacts controlled by the upper arm normally opened when the ventilator is closed, a pair of normally closed contacts controlled by the lower pivoted arm which are opened when the ventilator reaches its maximum opening, motor means operatively connected to the ventilator for opening and closing it having circuits leading through said switches for actuating said motor means in opposite directions and a thermostat controlling the motor circuit.

3. A greenhouse ventilator and heating system regulator comprising a pivoted ventilator, a vertically guided rod connected to the ventilator having an upper fixed stop and a lower adjustable stop, upper and lower pivoted arms, tension means for rocking the arms in opposite directions, one of which arms is moved against its tension when engaged by the upper stop when the ventilator is closed and the other arm being similarly operated upon engagement by the lower stop upon the ventilator reaching its maximum opening position, pairs of contacts controlled by the upper arm one pair being normally open when the ventilator is closed the other pair being normally closed, a greenhouse heating system having a control circuit governed by the last mentioned pair of contacts, a third pair of contacts controlled by the lower pivoted arm which are normally closed and adapted to be opened when the ventilator reaches its maximum open position, motor means operatively connected to the ventilator for opening and closing it, said means embodying two circuits one leading through those contacts which are closed by the upper arm when the ventilator is opened for actuating said motor means in one direction and the other leading through the contacts which are opened upon actuation of the lower arm.

4. A greenhouse ventilator regulator comprising a pivoted ventilator, a vertically guided rod connected to the ventilator having an upper fixed stop and a lower adjustable stop, upper and lower pivoted arms, tension means for rocking the arms in opposite directions, one of which arms is moved against its tension when engaged by the upper stop when the ventilator is closed and the other arm being similarly operated upon engagement by the lower stop upon the ventilator reaching its maximum opening position, a rod attached to the upper arm, a longitudinally adjustable latch member thereon adapted to be engaged by the first mentioned fixed stop to arrest its return movement for effecting a partial closure of the ventilator and a rocking of the pivoted arm, a pair of contacts controlled by the upper arm which are normally opened when the ventilator is closed to its predetermined position of closure, a pair of normally closed contacts controlled by the lower pivoted arm which are opened when the ventilator reaches its maximum opening, motor means operatively connected to the ventilator for opening and closing it having circuits leading through said switches for actuating said motor means in opposite directions and a thermostat controlling the motor circuit.

LARS HONGAARD LARSEN.

REFERENCES CITED

The following references are of record in the file of this patent:

UNITED STATES PATENTS

| Number | Name | Date |
|---|---|---|
| 1,820,764 | Abt | Aug. 25, 1931 |
| 1,952,350 | Armstrong | Mar. 27, 1934 |
| 2,005,891 | Elberty | June 25, 1935 |
| 2,054,071 | Cummings | Sept. 15, 1936 |

FOREIGN PATENTS

| Number | Country | Date |
|---|---|---|
| 259,522 | Germany | May 6, 1913 |